United States Patent
De Luca

(10) Patent No.: US 10,790,993 B2
(45) Date of Patent: Sep. 29, 2020

(54) COMPUTER SYSTEMS FOR GENERATING CERTIFIED DATA

(71) Applicant: Tolemaica S.r.I., Naples (IT)

(72) Inventor: Domenico De Luca, Naples (IT)

(73) Assignee: TOLEMAICA S.R.L., Naples (NA) (IT)

( * ) Notice: Subject to any disclaimer, the term of this patent is extended or adjusted under 35 U.S.C. 154(b) by 135 days.

(21) Appl. No.: 16/096,156

(22) PCT Filed: Apr. 19, 2017

(86) PCT No.: PCT/IB2017/052234
§ 371 (c)(1),
(2) Date: Oct. 24, 2018

(87) PCT Pub. No.: WO2017/187297
PCT Pub. Date: Nov. 2, 2017

(65) Prior Publication Data
US 2019/0097816 A1    Mar. 28, 2019

(30) Foreign Application Priority Data

Apr. 28, 2016  (IT) .................. 102016000043312

(51) Int. Cl.
*H04L 29/06* (2006.01)
*H04L 9/32* (2006.01)
(Continued)

(52) U.S. Cl.
CPC .......... *H04L 9/3268* (2013.01); *G06F 21/645* (2013.01); *G06Q 10/1091* (2013.01);
(Continued)

(58) Field of Classification Search
CPC ..... H04L 9/3268; H04L 9/3297; H04L 51/00; H04L 51/10; H04L 51/22; G06F 21/645;
(Continued)

(56) References Cited

U.S. PATENT DOCUMENTS

| | | | | |
|---|---|---|---|---|
| 2004/0125208 A1* | 7/2004 | Malone | ................ | H04L 9/3218 348/207.1 |
| 2007/0118739 A1* | 5/2007 | Togashi | ................ | G06Q 10/10 713/158 |
| 2010/0198712 A1* | 8/2010 | Benisti | ................ | G06Q 30/04 705/34 |

FOREIGN PATENT DOCUMENTS

| | | |
|---|---|---|
| EP | 1762864 A1 | 3/2007 |
| JP | 5467591 B2 | 4/2014 |

OTHER PUBLICATIONS

International Search Report and Written Opinion dated Aug. 16, 2017, in PCT Application No. PCT/IB2017/052234, 12 pages.

* cited by examiner

*Primary Examiner* — Yogesh Paliwal
(74) *Attorney, Agent, or Firm* — MH2 Technology Law Group, LLP

(57) ABSTRACT

The present description concerns a computer system for generating certified data, comprising an electronic device (2) equipped with an apparatus (21) for acquiring visual and/or sound data, a locator (22) and a memory (23), said device (2) being configured to establish a GSM network connection (24), a computer program (3) residing in said memory (23), said program (3) being configured to start the apparatus (21), acquire visual and/or sound data and, during the data acquisition step (31), start the locator (22) and acquire a location of the device (2), a system database (4), a first server (5) and a second server (6), which are managed by a first certification body and a second certification body respectively to certify said acquired visual and/or sound data.

9 Claims, 1 Drawing Sheet

(51) Int. Cl.
*G06F 21/64* (2013.01)
*H04L 12/58* (2006.01)
*G06Q 10/10* (2012.01)
*H04W 4/18* (2009.01)

(52) U.S. Cl.
CPC ............ *H04L 9/3297* (2013.01); *H04L 51/10* (2013.01); *H04L 51/22* (2013.01); *H04W 4/185* (2013.01); *G06F 2221/2111* (2013.01)

(58) Field of Classification Search
CPC ....... G06F 2221/2111; G06Q 10/1091; H04W 4/185
See application file for complete search history.

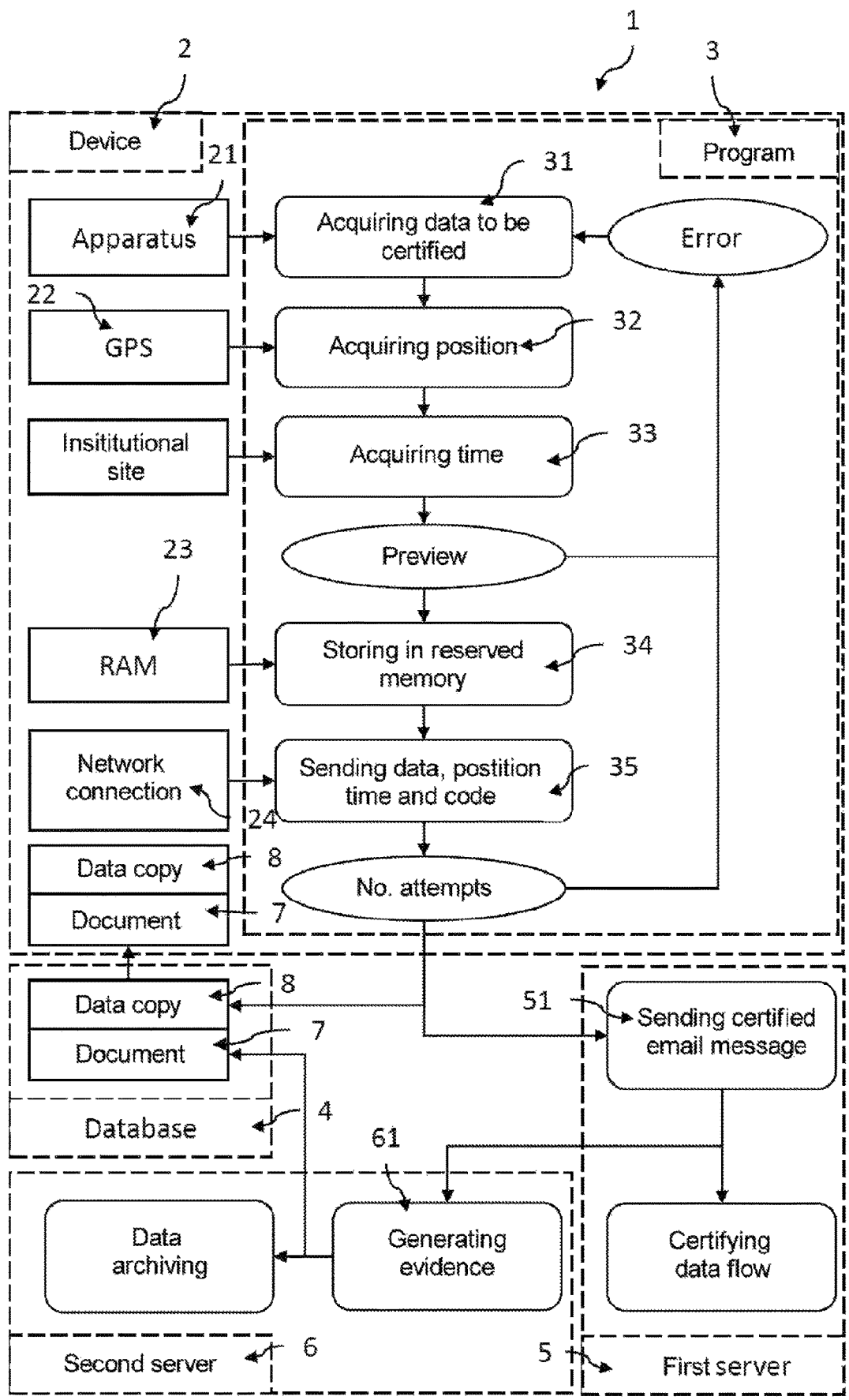

COMPUTER SYSTEMS FOR GENERATING CERTIFIED DATA

CROSS-REFERENCE TO RELATED APPLICATION(S)

This application is a national stage entry from International Application No. PCT/IB2017/052234, filed on Apr. 19, 2017, in the Receiving Office ("RO/IB") of the International Bureau of the World Intellectual Property Organization ("WIPO"), and published as International Publication No. WO 2017/187297 A1 on Nov. 2, 2017; International Application No. PCT/IB2017/052234 claims priority from Italian Patent Application No. 102016000043312, filed on Apr. 28, 2016, in the Italian Patent and Trademark Office ("IPTO"), the entire contents of all of which are incorporated herein by reference.

The present description relates to a computer system for generating certified visual and/or sound data as defined in the preamble of claim 1.

In the insurance industry, visual and/or sound data, e.g. photographs, videos or sound recordings, are used to testify the conditions of an insured asset before and/or after a given event, due to which a payment is due from the insurance company.

People in bad faith might file claims to insurance companies based on data that does not correspond to the insured asset, or that corresponds to it at times other than those being claimed.

As a result, an insurance company may decide to directly ascertain the state of the insured asset through especially skilled personnel, instead of allowing the customer to self-certify the damage. Alternatively, when an insurance company has reasons to suspect a fraud in data authenticity, lawsuits are instituted, whose result depends on the actual possibility to check the authenticity of the relevant data.

Therefore, there is the need in the art for a method or a procedure of acquiring visual and/or sound data that can certify their authenticity even when they are directly acquired by a customer. This would reduce frauds, and as a result the number of lawsuits, in much the same manner as certified electronic mail.

It is known that the use of certified electronic mail services allows one or more certification bodies to guarantee that, as soon an e-mail message has been sent, it has been delivered to the recipient's e-mail box. Thus, the message will have the same legal value as registered mail with delivery notice. Namely, due to the safety standards that are used and guaranteed, the recipient is strongly dissuaded from declaring in bad faith that he/she has not received the message, although this possibility cannot be excluded with certainty.

Nevertheless, while certified electronic mail services guarantee that an email message has been actually delivered and certify the presence of any attachments, such as images and/or videos and/or sounds, they cannot guarantee that this data actually represents an object in a given state and at a given time.

JP 2011109203, US 2004/125208 and EP 1762964 disclose methods of certifying the position and time in which an image is acquired.

In any case, no procedure is available that can establish a certain correspondence between the time in which the picture was shot and/or the video was recorded, and the object connected to the data that has been sent, as such data may have been tampered from the time of data acquisition to the time of data transmission.

Therefore, the object of the present invention is to provide a system of acquiring visual and/or sound data that can guarantee its authenticity, while obviating the above-mentioned drawbacks.

Such system may also find application outside the insurance industry, like certified electronic mail.

A further object of the invention is to allow such system to be easily implemented by any person concerned, without using especially skilled personnel.

These and other objects, as better explained hereafter, are fulfilled by a system for generating certified data as defined in the accompanying claim 1.

The description will be now described in greater detail in the annexed drawing, which depicts one embodiment of the invention, given by way of example and without limitation, in which FIG. 1 shows a schematic flow charge representing the operation of the system of the present invention.

Referring to FIG. 1, numeral 1 designates a computer system for generating certified data.

The system 1 of the present invention comprises an electronic device 2 equipped with an apparatus 21 for acquiring visual and/or sound data, a locator 22 and a memory 23. The device 2 is configured to establish a network connection 23 of GSM type (or later protocols such as GPRS, UMTS, HSPDA, etc.) for a user of the system 1.

The GSM network connection 24, in addition with the normal voice traffic, allows data to be transferred through the Internet.

The device 2 may be, for example, a smart phone or a tablet or a similar device having the same technical functions.

The device 2 may also consist of multiple distinct units in communication with one another, different units having the functions of the apparatus 21 and/or the memory 23 and/or the locator 22.

The apparatus 21 of the device 2 may be, for instance, a still camera, a video camera or a microphone, i.e. means configured to acquire visual and/or sound data such as photographs, videos and audio recordings, according to the data to be certified.

The locator 22 may be, for instance, a GPS system or, in addition, namely if the device 2 is a smart phone, the locator 22 may use location instruments such as the mobile network signal, or Wi-Fi antennas. Of course, different types of locators 22 can determine the position of the device 2 with various accuracy levels, and for proper position detection locators 22 with higher accuracy are preferred.

Advantageously, the device 2 of the system 1 has features that can be now used by people with no special technical skills, thus the system 1 may be directly operated by a user of the service, e.g. a person that has the interest of acquiring visual and/or sound data of certified authenticity, without requiring the intervention of specialized personnel or the purchase of devices 2 exclusively dedicated to the implementation of the present system 1.

The system 1 comprises a computer program 3 that resides in the memory 23 of the device 2 and is configured to carry out at least the steps as disclosed hereinbelow. The program 3 may be supplied by an administrator of the system 1 or a certification body, that verify its reliability and security.

The program 3 may be, for instance, a smart phone application, and may provide a series of screens to the user of the service, to guide the user through the various steps of operation of the program 3, leading to data certification, and possibly indicating a progress state.

The program 3 may optionally carry out functions that are not directly required for the data certification steps, but are connected thereto, e.g. management of certified data, as more clearly described hereinbelow.

One step 31 that is carried out by the program 3 consists in starting the apparatus 21 and acquiring visual and/or sound data, preferably in digital form.

The program 3 may use the apparatus 21 for acquiring individual data units, such as a single photograph, a single video or a single sound, or a plurality of photographs and/or videos and/or sounds.

Preferably, in this step 31 the program 3 directly starts the apparatus 21, whereas the user acts to acquire the visual and/or sound data, by an acquisition control or by adjusting the parameters of the apparatus 21, such as focusing and zooming in case of a camera, or the recording time.

Then, the program 3 is configured to carry out a step 32 that consists in starting the locator 22 and acquiring a position of the device 2, at the same time as the step 31 of acquiring the visual and/or sound data.

Subsequently, the program 3 is configured to carry out a step 33 that consists in establishing the GSM network connection 24, accessing a Web site that publishes a reliable time and acquiring such time, still at the same time as the step 21 of acquiring the visual and/or sound data.

The reliable time may be, for instance, a UTC or CET time, and may be obtained on official sites of institutional bodies. Non-limiting examples of data that provide a reliable time are time is and INRiM.

If the steps 32 and 33 of acquiring the position of the device 2 and the time are required to be carried out by the program 3 at the same time as the step 31 of acquiring the visual and/or sound data, the various steps 31, 32, 33 are intended to be carried out at a short time interval from each other, possibly at the same time.

Then, the program 3 shall display a preview of the visual and/or sound data, the position and time, with a request for confirmation by the user, before moving to the next steps. If the user does not confirm, the program 3 will restart from the step 31 of the acquiring the visual and/or sound data.

Possibly, separate previews may be provided for the visual and/or sound data acquired.

Advantageously, the program 3 directly operates the apparatus 21 and the locator 22 and directly connects to the time-publishing site, and receives therefrom visual and/or sound data, position and time respectively, whereas the user cannot personally introduce previously stored data, positions and times as desired into the program 3.

Then, the program 3 is configured to carry out a step 34 in which the visual and/or sound data, the position and the time are stored in a reserved portion of the memory 23 of the device 2, such that it will be only accessible by the program 3.

Therefore, this portion of the memory 23 cannot be accessed by the user and/or programs installed by the user and can only be accessed by the program 3.

This will prevent, for example, the visual and/or sound data, the position and the time to be replaced by the user when they are stored in the memory 23 of the device 2.

Still in view of preventing the stored visual and/or sound data from being tampered, the reserved portion of the memory 23 of the device 2 which stores the visual and/or sound data, the position and the time is a RAM memory.

Access to the reserved portion of the memory 23 of the device 2 and alteration of the visual and/or sound data contained therein by the user shall not be intended to be entirely excluded, nevertheless, the choice of storing data in a RAM memory 23 in the step 34 allows this to be only accomplished using advanced and burdensome computer methods.

Optionally, to further reduce the possibility of changing the stored visual and/or sound data, there may be provided that, if a disruption of the operation of the program 3 is detected, the program 3 shall be restarted from the step 31 of starting the apparatus 21 and acquiring the visual and/or sound data, and the visual and/or sound data, the positions and/or the times that were previously stored in the RAM memory 23 of the device 2 shall be erased or ignored.

Advantageously, an attempt to alter the RAM memory 23 of the device 2 that would stop the operation of the program 3 would not lead to certification of altered visual and/or sound data.

In one aspect of the invention, the system 1 comprises a system database 4, a first server 5 and a second server 6.

The first server 5 and the second server 6 are managed by a first certification body and a second certification body respectively, These certification bodies are preferably third parties, impartial with respect to the user and to any recipients of the visual and/or sound data, e.g. insurance companies. These certification bodies are preferably recognized by national authorities, e.g. the Italian AgID, for their certifications to have a legal value, in much the same manner as certified electronic mail certifiers.

Advantageously, the system 1 of the present invention may be used by certification bodies that already provide certified electronic mail services.

Therefore, the program 3 is configured to associate information elements comprising an alphanumeric identification code, the acquired position and the acquired time, with the visual and/or sound data being stored.

Thus, the visual and/or sound data so acquired and stored are equipped with information elements associated therewith (i.e. the position, time and code) that allow the stored visual and/or sound data to be uniquely identified, with their geographic origin and time information.

Then, the program 3 is configured to carry out a step 35 in which the GSM network connection 24 of the device 2 is established (it is not already on), and the stored visual and/or sound data and the information elements associated therewith are sent to the system database 4 and the first server 5. Thus, the system database 4 will have an exact copy 8 of the stored visual and/or sound data and the information elements associated therewith.

The first server 5 is configured to carry out a step 51 of generating a timestamp for the visual and/or sound data it has received and/or a certified e-mail message containing the visual and/or sound data and the information elements associated with the stored visual and/or sound data and sending the message to the second server 6. Thus, the first server 5 may certify the digital flow containing the stored visual and/or sound data and the information elements associated therewith, whereas the second server 6 which receives such visual and/or sound data may store them.

As the visual and/or sound data and the information elements associated with the visual and/or sound data are received on the second server 6, they can be deemed to be certified.

Advantageously, with the use of the certified electronic mail, the administrator of the first server 5 may be certain that the visual and/o sound data and the information elements associated with the visual and/or sound data have been delivered, which allows certification to be notified to the user.

Preferably, in the step 35 in which the stored visual and/or sound data and the information elements associated with the stored visual and/or sound data are sent to the first server 5, and in the step 51 in which the certified electronic mail is sent from the first server 5 to the second server 6, the device 2, the first server 5, the second server 6 and the database 4 are configured to use a Web service and a cryptographic security protocol, e.g. https.

Advantageously, the device 2 and the servers 5, 6 are able to communicate even when they use different operating systems and/or programming languages.

Furthermore, the security protocol ensures the security and integrity of the image and position that are being sent, which are delivered with no alteration.

In one embodiment, in case of failure to send the stored visual and/or sound data and the information elements associated with the stored visual and/or sound data, during step 35, the program 3 is configured to make a number of resending attempts, e.g. five attempts, with a time interval therebetween.

Likewise, in case of failure to send the e-mail message from the first server 5 to the second server 6 in step 51, the first server 5 is configured to make a number of resending attempts, with a time interval therebetween. The number of attempts and the time intervals may be the same for the two different steps 35 and 51 or may be different.

It the maximum number of attempts has been attained and the stored visual and/or sound data and the information elements associated with the stored visual and/or sound data have not been successfully sent yet, an error may be indicated. In this case, there may be provided that the program 3 shall restart, for example, from step 31 of acquiring the image.

Once the stored visual and/or sound data and the information elements associated with the stored visual and/or sound data have been sent to the first server 5, in step 35, the visual and/or sound data and the information elements associated therewith may be erased from the memory 23 of the device 2. Alternatively, a copy of the stored visual and/or sound data and the information elements associated therewith may be preserved in the device 2. In either case, the certification process only continues for the visual and/or sound data and the information elements associated therewith that are received by the first server 5 in step 35, and sent by the first server 5 to the second server 6, whereas any copies stored in the memory 23 in the device will remain uncertified.

In one aspect of the system 1, the second server 6 is configured to store the content of the certified e-mail message received from the first server 5. Advantageously, in case of damage to the visual and/or sound data preserved elsewhere a copy thereof can be retrieved from the second server 6.

The second server 6 is further configured to carry out a step 61 of generating evidence containing information about archiving of the visual and/or sound data and sending the evidence to the system database 4.

The evidence preferably comprises an archiving date and identification data of the certification bodies involved.

The evidence may comprise a copy of the stored visual and/or sound data and/or the information elements associated therewith.

In one aspect of the system 1, once the system database 4 has received the evidence, it is configured to generate a document 7 containing the information elements associated with the visual and/or sound data.

Therefore, the document 7 contains the position, the time of acquisition of the visual and/or sound data, the alphanumeric code and may further containing the archiving date and the data of the certification bodies contained in the evidence.

Then, the database 4 is configured to send the visual and/or sound data with the document 7 to a mail address indicated by the user, i.e. the device itself.

Therefore, the user will receive a certified copy 8 of the visual and/or sound data it has acquired.

The document 7 annexed to such visual and/or sound data allows identification of the visual and/or sound data and verification of the conditions under which they have been acquired and the certification process.

The first and second certification bodies will have to guarantee the legal value of the document 7 since the archiving date, i.e. that the visual and/or sound data identified by a given alphanumeric code match the position and acquisition time indicated in the document 7.

Preferably, before sending the visual and/or sound data and the document 7 to the user, the database 4 is configured to check whether the alphanumeric code of the visual and/or sound data received by the device 2 matches the visual and/or sound data contained in the evidence received by the second server 6.

Optionally, e.g. in case of sounds and/or images related to standard restrictions, the system database 4 may be configured to allow copies 8 of the visual and/or sound data, the document 7 and/or the evidence to be only accessed by the user that acquired the visual and/or sound data (original user) and not to users that do not have the requested legal privileges.

The original user is preferably allowed to set the privacy level for the visual and/or sound data of the document 7 and the evidence, i.e. to decide which set of users may access a copy 8 thereof in the system database 4.

Access to copies 8 thereof may be allowed to the user free of charge, and to other users with access charges.

The program 3 preferably provides facilitated access to the documents 7, the visual and/or sound data and the evidence. For example, a search service may be provided for access to copies 8 thereof in the system database 4, the first server 5 or the second server 6. Such search may be based, for instance, on the type of acquired data, the position and time of acquisition, and/or the user that acquired it. The search service is preferably associated with the program 3.

Preferably, the visual and/or sound data and the evidence concerning the various certified visual and/or sound data are preserved in the second server 6 and are protected by a firewall.

Likewise, firewall-protected preservation may be provided for the documents in the system database 4 and the evidence of the digital flow in the first server 5.

Preferably, the administrator of the system database 4 is the only one to access the evidence in the second server 6 to obtain new certified copes 8 of the document 7 if the copies 8 that have been filed into the system database 4 must be restored.

Those skilled in the art will obviously appreciate that a number of changes and variants as described above may be made to fulfill particular requirements, without departure from the scope of the invention, as defined in the following claims.

The invention claimed is:

1. A computer system for generating certified data, the computer system comprising:

an electronic device equipped with an apparatus for acquiring visual and/or sound data, a locator and a memory, said device being configured to establish a Global System for Mobile communications (GSM) network connection;

a computer program residing in said memory, said program being configured to start the apparatus, acquire visual and/or sound data and, during the data acquisition step, start the locator and acquire a location of the device;

a system database; and a first server and a second server, managed by a first certification body and a second certification body respectively;

wherein said program is configured to:
- start the GSM network connection and access a website that provides a certified time, and acquire such time at the same time as the step of acquiring the visual and/or sound data,
- storing said data, said location and said time in a reserved portion of said memory, such that it can be only accessed by the program,
- associating information elements comprising an alphanumeric identification code, said position and said time, with said stored visual and/or sound data,
- sending said stored visual and/or sound data and said information elements associated with the visual and/or sound data to said system database and said first server,
- said first server is configured to generate a certified e-mail message containing said stored visual and/or sound data and said information elements associated with the stored visual and/or sound data and to send it to said second server,
- said second server is configured to archive the content of said certified email message to generate evidence containing archiving information, and send the evidence to the system database, and
- upon reception of the evidence, said system database is configured to generate a document containing the information elements associated with the stored visual and/or sound data, and to send said data and said document to a user-specified e-mail address.

2. The computer system of claim 1, wherein the stored visual and/or sound data and the evidence are held in the second server and are protected by a firewall.

3. The computer system of claim 1, wherein in the steps of sending the stored visual and/or sound data and the information elements associated with the stored visual and/or sound data by the program to the first server and the system database, and sending the certified e-mail message by the first server to the second server, the device, the first server, the second server and the system database are configured to use a Web service and a cryptographic security protocol.

4. The computer system of claim 1, wherein:
in the step of sending the stored visual and/or sound data and the information elements associated with the stored visual and/or sound data, to the first server and the system database, in case of failure, the program is configured to make a number of resending attempts, separated by an interval of time, and
in the step of sending the message to the second server, in case of failure, the first server is configured to make a number of resending attempts, separated by an interval of time.

5. The computer system of claim 1, wherein:
the system database is configured to make a copy of the data, the documents and/or the evidence of the document accessible to a set of users by means of a service allowing search by user, location and acquisition time.

6. The computer system of claim 5, wherein:
said system database is managed by an administrator, and said administrator has exclusive access to said evidence archived in the second server to obtain new certified copies of the document.

7. The computer system of claim 1, wherein said dedicated memory portion is a random access memory (RAM) portion that can only be accessed by the program.

8. The computer system of claim 1, wherein said apparatus comprises a still camera and/or a video camera and/or a microphone.

9. The computer system of claim 1, wherein before sending the stored visual and/or sound data and the document to the user, the system database is configured to check whether the alphanumeric code associated with the visual and/or sound data received by the device matches the alphanumeric code associated with the visual and/or sound data contained in the evidence received by the second server.

* * * * *